US008556611B2

(12) United States Patent
Dolan et al.

(10) Patent No.: US 8,556,611 B2

(45) Date of Patent: Oct. 15, 2013

(54) METHOD FOR INTERSTITIAL POLYMER PLANARIZATION USING A FLEXIBLE FLAT PLATE

(75) Inventors: Bryan R. Dolan, Rochester, NY (US); Peter J. Nystrom, Webster, NY (US); Gary D. Redding, Victor, NY (US); Mark A. Cellura, Webster, NY (US); John R. Andrews, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 88 days.

(21) Appl. No.: 13/165,785

(22) Filed: Jun. 21, 2011

(65) Prior Publication Data

US 2012/0328784 A1 Dec. 27, 2012

(51) Int. Cl.
*B29C 43/20* (2006.01)

(52) U.S. Cl.
USPC .......... 425/89; 425/128

(58) Field of Classification Search
CPC .......... B29C 43/203
USPC .......... 425/89, 128
See application file for complete search history.

(56) References Cited

U.S. PATENT DOCUMENTS

| | | | | |
|---|---|---|---|---|
| 3,615,946 A * | 10/1971 | Palmer | 438/125 |
| 3,616,014 A * | 10/1971 | Weglin | 156/228 |
| 4,806,195 A * | 2/1989 | Namysl | 156/382 |
| 5,578,159 A * | 11/1996 | Miyashita et al. | 156/358 |
| 6,100,114 A * | 8/2000 | Milkovich et al. | 438/127 |
| 2004/0075988 A1* | 4/2004 | Tatsumi et al. | 361/748 |
| 2011/0141204 A1 | 6/2011 | Dolan et al. | |

FOREIGN PATENT DOCUMENTS

JP 60025714 A * 2/1985

OTHER PUBLICATIONS

Bryan R. Dolan et al., "Polymer Layer Removal on PZT Arrays Using a Plasma Etch", U.S. Appl. No. 13/011,409, filed Jan. 21, 2011.

* cited by examiner

*Primary Examiner* — Robert B Davis

(74) *Attorney, Agent, or Firm* — MH2 Technology Law Group LLP

(57) ABSTRACT

A method and structure for forming an ink jet print head having a dielectric interstitial layer. A flexible top plate attached to a press can be used to apply pressure to an uncured dielectric interstitial layer. The uncured dielectric interstitial layer is cured while contacting the uncured dielectric interstitial layer with the flexible top plate and applying pressure using the press. Using a flexible top plate rather than a rigid top plate has been found to form a cured interstitial layer over an array of piezoelectric elements which has a more uniform or planar upper surface. An interstitial layer so formed can result in decreased processing time, reduced problems with ink communication in the ink jet print head during use, and decreased manufacturing costs.

5 Claims, 11 Drawing Sheets

METHOD FOR INTERSTITIAL POLYMER PLANARIZATION USING A FLEXIBLE FLAT PLATE

FIELD OF THE INVENTION

The present teachings relate to the field of ink jet printing devices and, more particularly, to methods of making a high density piezoelectric ink jet print head and a printer including a high density piezoelectric ink jet print head.

BACKGROUND OF THE INVENTION

Drop on demand ink jet technology is widely used in the printing industry. Printers using drop on demand ink jet technology can use either thermal ink jet technology or piezoelectric technology. Even though they are more expensive to manufacture than thermal ink jets, piezoelectric ink jets are generally favored as they can use a wider variety of inks and reduce or eliminate problems with kogation.

Piezoelectric ink jet print heads typically include a flexible diaphragm and an array of piezoelectric elements (i.e., transducers or PZT's) attached to the diaphragm. When a voltage is applied to a piezoelectric element, typically through electrical connection with an electrode electrically coupled to a voltage source, the piezoelectric element bends or deflects, causing the diaphragm to flex which expels a quantity of ink from a chamber through a nozzle. The flexing further draws ink into the chamber from a main ink reservoir through an opening to replace the expelled ink.

Increasing the printing resolution of an ink jet printer employing piezoelectric ink jet technology is a goal of design engineers. Increasing the jet density of the piezoelectric ink jet print head can increase printing resolution. One way to increase the jet density is to eliminate manifolds which are internal to a jet stack. With this design, it is preferable to have a single port through the back of the jet stack for each jet. The port functions as a pathway for the transfer of ink from the reservoir to each jet chamber. Because of the large number of jets in a high density print head, the large number of ports, one for each jet, must pass vertically through the diaphragm and between the piezoelectric elements.

Processes for forming a jet stack can include the formation of an interstitial layer from a polymer material between each piezoelectric element and, in some processes, over the top of each piezoelectric element. If the interstitial layer is dispensed over the top of the each piezoelectric element, it is removed to expose the conductive piezoelectric element. Next, a patterned standoff layer having openings therein can be applied to the interstitial layer, where the openings expose the top of each piezoelectric element. A quantity (i.e., a microdrop) of conductor such as conductive epoxy, conductive paste, or another conductive material is dispensed individually on the top of each piezoelectric element. Electrodes of a flexible printed circuit (i.e., a flex circuit) or a printed circuit board (PCB) are placed in contact with each conductor microdrop to facilitate electrical communication between each piezoelectric element and the electrodes of the flex circuit or PCB. The standoff layer functions to contain the flow of the conductive microdrops to the desired locations on top of the piezoelectric elements, and also functions as an adhesive between the interstitial layer and the flex circuit or PCB.

During the formation of the jet stack, it is important to keep jet stack layers such as the interstitial layer uniformly thick across the surface of the jet stack. Thickness conformity is advantageous as it can help mitigate issues caused by jet stack thickness variation, PZT thickness variation, or attachment thickness variation. Forming the interstitial layer to a uniform thickness decreases problems such as poor ink communication within the completed printhead, and can reduce the incidence of ink leaks within the printhead.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment, a method for forming an ink jet print head can include dispensing an uncured dielectric interstitial layer over an array of piezoelectric elements, interposing a flexible top plate and a mold release between the uncured dielectric interstitial layer and an upper press plate, contacting the uncured dielectric interstitial layer with the mold release and applying pressure to the uncured dielectric interstitial layer using the upper press plate while maintaining contact between the uncured dielectric interstitial layer and the mold release, wherein the flexible top plate flexes during the application of pressure to the uncured dielectric interstitial layer. Further, curing the dielectric interstitial layer while maintaining contact between the uncured dielectric interstitial layer and the mold release and applying the pressure to the uncured dielectric interstitial layer using the upper press plate.

In another embodiment, an apparatus for forming an ink jet print head can include a press having a lower press cassette and an upper press plate, a mold release, and a flexible top plate comprising at least one of glass, silicon, quartz, sapphire, and metal, wherein the one of glass, silicon, quartz, sapphire, and metal has a thickness of between about 25 μm and about 12,700 μm, wherein the mold release and the flexible top plate are configured to be interposed between an uncured interstitial layer and the upper press plate.

In another embodiment, a method for forming an ink jet printer can include forming at least one ink jet print head using a method which includes dispensing an uncured dielectric interstitial layer over an array of piezoelectric elements, interposing a flexible top plate and a mold release between the uncured dielectric interstitial layer and an upper press plate, contacting the uncured dielectric interstitial layer with the mold release and applying pressure to the uncured dielectric interstitial layer using the upper press plate while maintaining contact between the uncured dielectric interstitial layer and the mold release, wherein the flexible top plate flexes during the application of pressure to the uncured dielectric interstitial layer. Further, curing the dielectric interstitial layer while maintaining contact between the uncured dielectric interstitial layer and the mold release and applying the pressure to the uncured dielectric interstitial layer using the upper press plate. The method can further include installing the at least one print head into a printer housing.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. may have been simplified and are drawn to facilitate understanding of the inventive embodiments rather than to maintain strict structural accuracy, detail, and scale.

DESCRIPTION OF THE EMBODIMENTS

Reference will now be made in detail to embodiments of the present teachings, an example of which is illustrated in the accompanying drawings. Wherever possible, the same reference numbers will be used throughout the drawings to refer to the same or like parts.

As used herein, the word "printer" encompasses any apparatus that performs a print outputting function for any purpose, such as a digital copier, bookmaking machine, facsimile machine, a multi-function machine, electrostatographic device, etc. The word "polymer" encompasses any one of a broad range of carbon-based compounds formed from long-chain molecules including thermoset polyimides, thermoplastics, resins, polycarbonates, epoxies, and related compounds known to the art.

Figure 1:
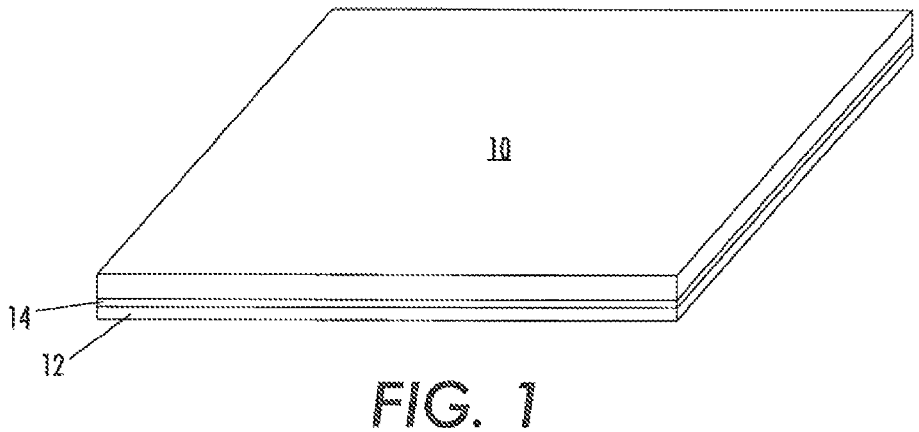
FIGS. 1 and 2 are perspective views of intermediate piezoelectric elements of an in-process device in accordance with an embodiment of the present teachings.

In the perspective view of FIG. 1, a piezoelectric element layer 10 is detachably bonded to a transfer carrier 12 with an adhesive 14. The piezoelectric element layer 10 can include, for example, a lead-zirconate-titanate layer between about 25 μm to about 150 μm thick, to function as an inner dielectric. The dielectric layer can be plated on both sides with nickel, for example, using an electroless plating process to provide conductive elements on each side of the dielectric layer. The nickel-plated dielectric structure 10 functions essentially as a parallel plate capacitor which develops a difference in voltage potential across the inner dielectric material. The carrier 12 can include a metal sheet, a plastic sheet, or another transfer carrier. The adhesive layer 14 which attaches the piezoelectric element layer 10 to the transfer carrier 12 can include a dicing tape, thermoplastic, or another adhesive. In another embodiment, the transfer carrier 12 can be a material such as a self-adhesive thermoplastic layer such that a separate adhesive layer 14 is not required.

Figure 2:
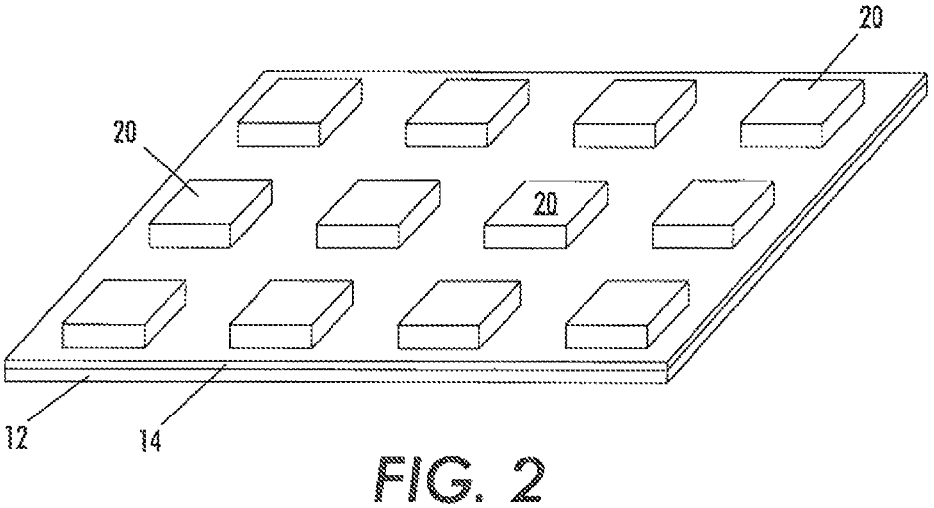

After forming the FIG. 1 structure, the piezoelectric element layer 10 is diced to form a plurality of individual piezoelectric elements 20 as depicted in FIG. 2. It will be appreciated that while FIG. 2 depicts 4×3 array of piezoelectric elements, a larger array can be formed. For example, current print heads can have a 344×20 array of piezoelectric elements. The dicing can be performed using mechanical techniques such as with a saw such as a wafer dicing saw, using a dry etching process, using a laser ablation process, etc. To ensure complete separation of each adjacent piezoelectric element 20, the dicing process can terminate after removing a portion of the adhesive 14 and stopping on the transfer carrier 12, or after dicing through the adhesive 14 and part way into the carrier 12.

Figure 3:
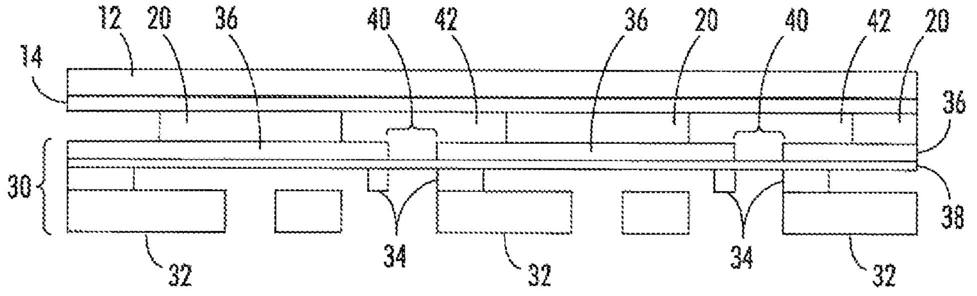
FIGS. 3-8 and 11-19 are cross sections depicting the formation of an ink jet print head including a jet stack of an in-process device.

After forming the individual piezoelectric elements 20, the FIG. 2 assembly can be attached to a jet stack subassembly 30 as depicted in the cross section of FIG. 3. The FIG. 3 cross section is magnified from the FIG. 2 structure for improved detail, and depicts cross sections of one partial and two complete piezoelectric elements 20. The jet stack subassembly 30 can be manufactured using known techniques. The jet stack subassembly 30 can include, for example, an inlet/outlet plate 32, a body plate 34, and a diaphragm 36 which is attached to the body plate 34 using an adhesive diaphragm attach material 38. The diaphragm 36 can include a plurality of openings 40 for the passage of ink in the completed device as described below. The FIG. 3 structure further includes a plurality voids 42 which, at this point in the process, can be filed with ambient air. The diaphragm attach material 38 can be a solid sheet of material such as a single sheet polymer so that the openings 40 through the diaphragm 36 are covered.

In an embodiment, the FIG. 2 structure can be attached to the jet stack subassembly 30 using an adhesive between the diaphragm 36 and the piezoelectric elements 20. For example, a measured quantity of adhesive (not individually depicted) can be dispensed, screen printed, rolled, etc. onto either the upper surface of the piezoelectric elements 20, onto the diaphragm 36, or both. In an embodiment, a single drop of adhesive can be placed onto the diaphragm for each individual piezoelectric element 20. After applying the adhesive, the jet stack subassembly 30 and the piezoelectric elements 20 are aligned with each other, then the piezoelectric elements 20 are mechanically connected to the diaphragm 36 with the adhesive. The adhesive is cured by techniques appropriate for the adhesive to result in the FIG. 3 structure.

Subsequently, the transfer carrier 12 and the adhesive 14 are removed from the FIG. 3 structure to result in the structure of FIG. 4.

Figure 4:
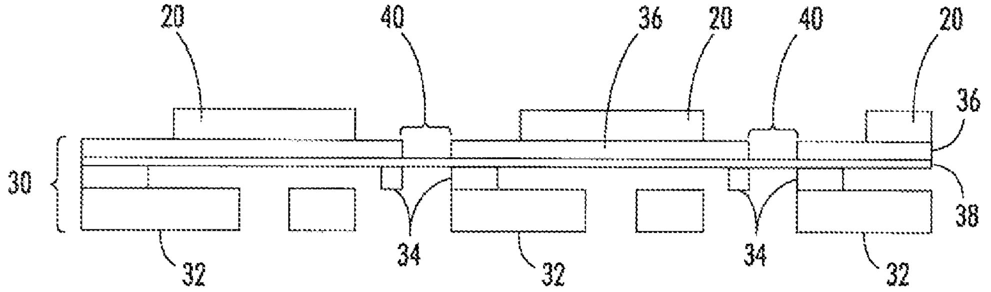
Figure 5:
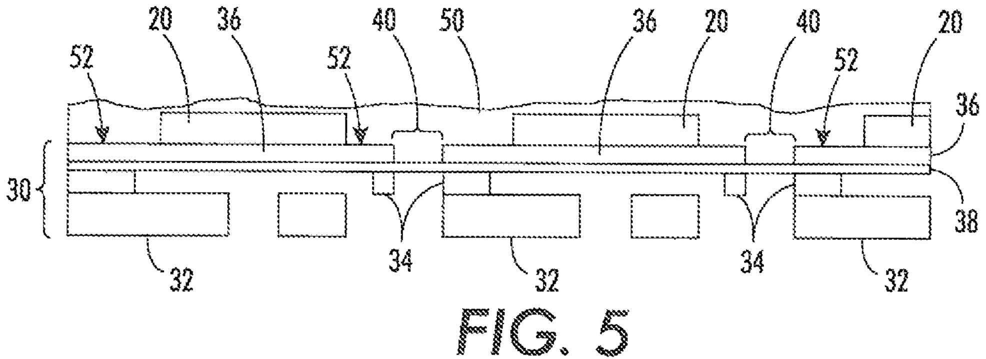

Next, an uncured dielectric interstitial layer 50 is dispensed over the FIG. 4 structure as depicted in FIG. 5. The interstitial layer can be a polymer, for example a combination of Epon™ 828 epoxy resin (100 parts by weight) available from Miller-Stephenson Chemical Co. of Danbury, Conn. and Epikure™ 3277 curing agent (49 parts by weight) available from Hexion Specialty Chemicals of Columbus, Ohio. The interstitial layer 50 can be dispensed in a quantity sufficient to cover exposed portions of an upper surface 52 of the diaphragm 36 and to encapsulate the piezoelectric elements 20 subsequent to curing. The interstitial layer 50 can further fill the openings 40 within the diaphragm 36 as depicted. The diaphragm attach material 38 which covers openings 40 in the diaphragm 36 prevents the dielectric fill material from passing through the openings 40.

Prior to curing the interstitial layer 50, a leveling process is performed to provide an interstitial layer 50 having a uniform thickness. The leveling process is performed to distribute the interstitial layer 50 so that it covers each piezoelectric element 20 with the same material thickness. If the interstitial layer 50 is not leveled or is poorly leveled, it can be thicker over some piezoelectric elements 20 than others. Because the interstitial layer 50 has a relatively slow etch rate during its removal to expose the piezoelectric elements 20, even a small increase in thickness resulting from poor leveling can result in a substantial increase in processing time to ensure each piezoelectric element 20 is exposed, which decreases production throughput and increases costs. Etch time of the interstitial layer 50 to expose the piezoelectric elements 20 can exceed 30 minutes to remove a 4 μm thick polymer interstitial layer. Further, a non-uniform interstitial layer thickness can result in ink communication problems in the completed device.

Figure 6:
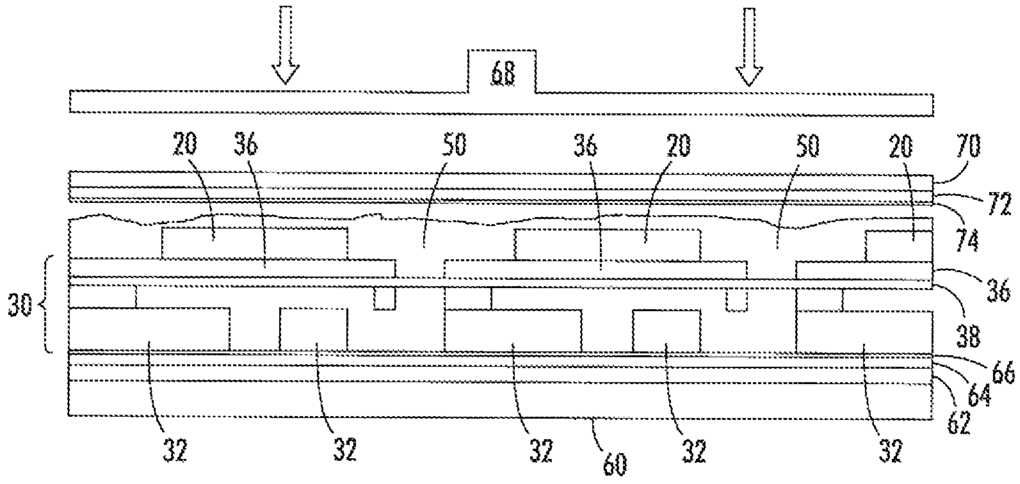

In an embodiment of the leveling process of the present teachings, the FIG. 5 device can be placed on a supporting surface as depicted in FIG. 6. In another embodiment, the FIG. 4 device can be placed onto the supporting surface prior to dispensing the interstitial layer 50, and then the interstitial layer 50 is deposited. The supporting surface can include a stack press heater 60, a substrate 62 such as a conventional lower press cassette, a reusable or disposable liner 64, and a mold release coating 66. The liner 64 can include a material such as a sheet of polymer, polyimide, or plastic. The mold release coating 66 can include a layer of fluoropolymer coated onto the liner 64 to a thickness which is sufficient to prevent the partial jet stack 30 from adhering to the liner 64. The release coating 66 can be applied by various techniques, such as spray coating or using a squeegee.

The leveling process can further include an upper press plate 68, a flexible intermediate substrate 70, a flexible flat plate (top plate) 72, and a mold release 74. The mold release 74 can be a coating applied to the surface of the flexible top plate 72, or the mold release 74 can be a liner (for example, polymer, polyimide, plastic, metal) coated with a mold release compound such as a fluoropolymer and interposed between the flexible top plate 72 and the interstitial layer 50. The flexible intermediate substrate 70 can be, for example, a layer of silicone rubber between about 1 mm and about 25 mm thick. The flexible top plate 72 can be, for example, glass or silicon wafer which is sufficiently thin to be flexible. In an embodiment, the flexible top plate 72 can be a Borofloat® glass wafer, available from Schott North America, Inc. of Louisville, Ky. In other embodiments, the flexible top plate can be manufactured from a material such as quartz, sapphire, metal, etc., and can be either an electrical conductor or an electrical insulator. The flexible top plate 72 can be between about 25 micrometers (μm) and about 12,700 μm, or between about 500 μm and about 900 μm, or between about 650 μm and about 750 μm, for example about 700 μm.

In an embodiment, a "flexible" top plate can be one that is manufactured from a rigid material, but is sufficiently thin to allow for slight bending or deflection without fracture or permanent deformation. A "flexible" top plate can be formed from a material which has a bending strength (i.e., flexural strength or modulus of rupture) of between about 1 megapascal (MPa) and about 300 MPa, or between about 5 MPa and about 100 MPa, or between about 10 MPa and about 50 MPa, for example about 25 MPa. In another embodiment, the flexible top plate has a bending strength of no less than 10 MPa and no more than 50 MPa. A material which is either too rigid or too flexible will not sufficiently level the interstitial layer. The flexible top plate can have a flatness (peak to valley) of between about 1.0 nanometer (nm) and about 5.0 μm.

To perform the leveling, flexible intermediate substrate 70, the flexible top plate 72, and the mold release 74 are interposed between the upper press plate 68 and the interstitial layer 50. This can be performed by aligning the mold release 74, the flexible top plate 72, and the flexible intermediate substrate 70 with the jet stack, then placing them onto the interstitial layer 50. In another embodiment, the flexible intermediate substrate 70, optionally, can be attached to the upper press plate 68, the flexible top plate 72, optionally, can be attached to the flexible intermediate substrate 70, and the mold release 74, optionally, can be coated onto or attached to the flexible top plate 72.

Figure 7:
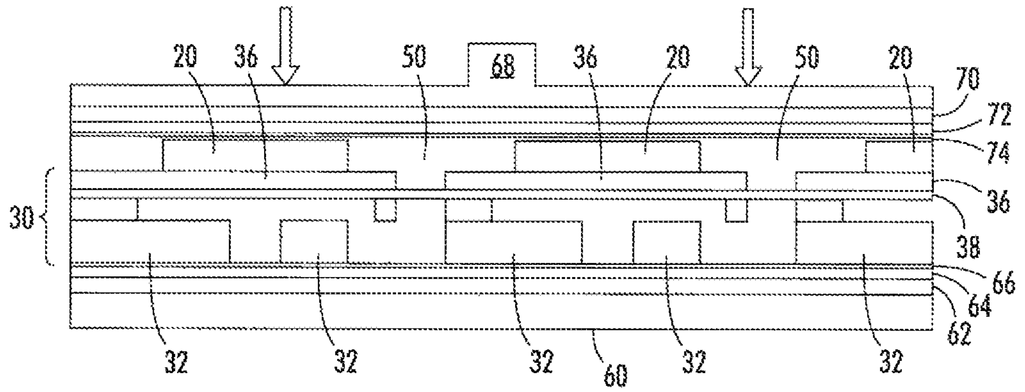

Subsequently, the upper press plate 68 is moved toward the interstitial layer 50 which covers the piezoelectric elements 20. After physical contact under press pressure is established between the mold release 74 and the interstitial layer 50 as depicted in FIG. 7, the press can hold the flexible top plate 72 in contact with the interstitial layer 50 at a pressure of between about 10 psi and about 500 psi, or between about 100 psi and about 300 psi, or between about 225 psi and about 275 psi. The stack press heater 60 can be heated to a temperature of between about 50° C. and about 250° C. to speed curing of the interstitial layer 50 by transfer of the heat through the jet stack subassembly 30 to the interstitial layer 50. The interstitial layer 50 is heated under pressure for between about 10 minutes and about 120 minutes, or for a duration sufficient to adequately cure the interstitial layer 50.

During dispensing and curing of the interstitial layer 50, the liner 64 prevents interstitial material from flowing onto the lower cassette after it has been squeezed flat. The liner 64 can be discarded and replaced after completion of the leveling process, or it can be cleaned and reused. The liner 64 is optional and, in another embodiment, the lower press cassette 62 can be cleaned after curing the interstitial layer, rather than using a liner 64.

Figure 8:
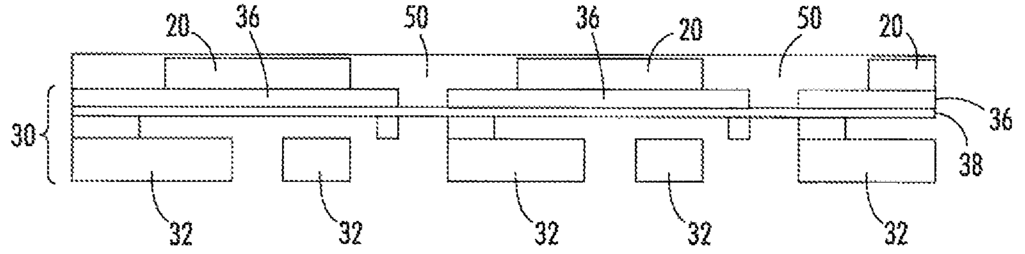

After removal from the press, a jet stack subassembly similar to that depicted in FIG. 8 can remain.

Figure 9:
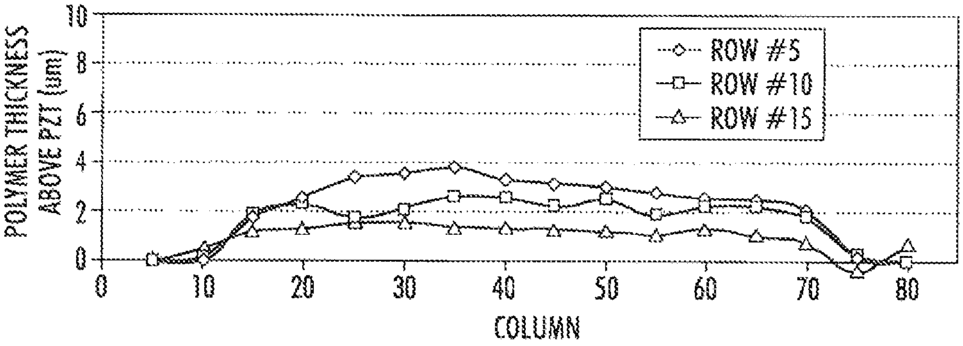
FIGS. 9 and 10 are graphs depicting thicknesses for an interstitial layer formed using a rigid top plate and a flexible top plate respectively.
Figure 10:
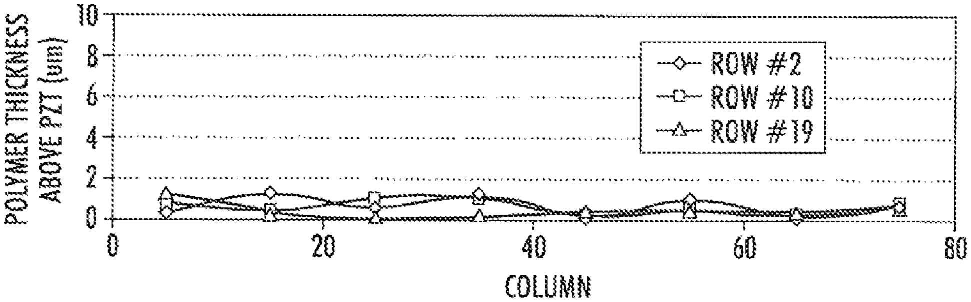

During testing comparing the use of a rigid top plate and a flexible top plate in a press and cure process, it was found that using a flexible top plate as described formed an interstitial layer 50 having a more uniform upper surface than a process which used a rigid top plate. The interstitial layer formed over an array of piezoelectric electrodes using a rigid top plate during a press and cure process was found to have a crown or convex shape. FIG. 9 depicts results using a rigid top plate, and resulted in a thickness variation of from about 0 μm (i.e., an exposed piezoelectric electrode) to about 4 μm, depending on the row and column in the piezoelectric array. In contrast, FIG. 10 depicts results using a flexible top plate in which the variation in the thickness of the resulting interstitial layer is about half the variation of the interstitial layer formed using a rigid top plate.

Without intending to be bound by theory, the flexibility of the top plate creates compliance in the stack-up as the flexible top plate conforms to the PZT array and to the substrate. The flexible top plate may flex during the application of pressure using the press, such that any uneven contour of the substrate 62 is counterbalanced. Since the plate is somewhat rigid, buckling into the interstitial region or around the PZT array perimeter does not occur. While the reason for the interstitial crown when using a rigid top plate is not known, it may be that the substrate 62 of the supporting surface did not provide adequate and/or uniform support across the PZT array while the polymer was curing, such that the entire PZT array, for example the center of the array, was not uniformly pressed against the rigid top plate during the press and cure process. Providing an optical flat for the substrate 62 may improve interstitial layer uniformity, but would reduce heat applied to the interstitial layer during the curing process by acting as a thermal barrier, thereby increasing interstitial curing time. While a thermally conductive substrate would improve heat transfer from the lower press cassette to the interstitial layer during curing, optical flats, for example a polished aluminum or molybdenum optical flat, which would be sufficient for this purpose are difficult to manufacture and expensive. The cost becomes more of a factor with increasing printhead sizes, which can include a PZT array which is up to 12 inches or more in length.

Figure 11:
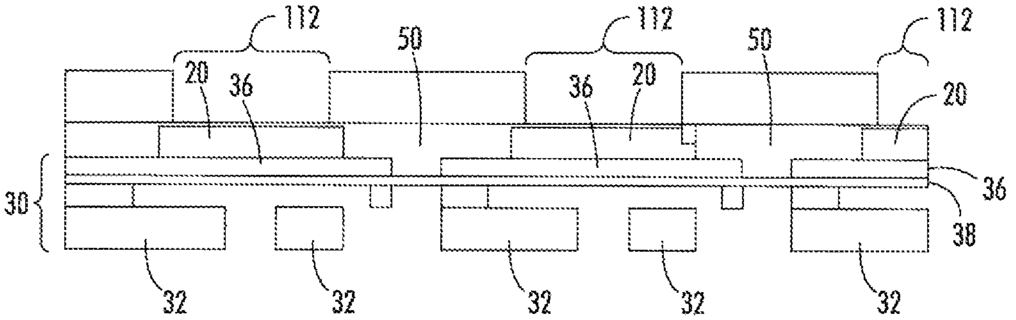

After forming the structure of FIG. 8, printhead processing can continue, for example by removing a first portion of the interstitial layer 50 from the upper surface of the piezoelectric elements 20 and leaving a second portion of the interstitial layer between adjacent piezoelectric elements 20. In an embodiment, a patterned mask 110 such as a patterned photoresist mask can be formed with openings 112 using known photolithographic techniques as depicted in FIG. 11. The openings 112 expose a portion of the interstitial layer 50 which covers each piezoelectric element 20, and further expose a portion of each piezoelectric element 20 as depicted.

In another embodiment, the patterned mask 110 can be a layer of thermoplastic polyimide. For example, the patterned mask 110 can be a layer of DuPont® 100ELJ, which is patterned using laser ablation, a punch process, etching, etc. DuPont 100ELJ is typically manufactured and provided in a thickness of 25 μm (0.001 inch), although other thicknesses would be suitable if available, for example between about 20 μm to about 40 μm. In an embodiment, a thermoplastic polyimide mask can be attached to the surface of the polymer interstitial layer 50 using a heat lamination press. In an embodiment, the attachment can occur at a temperature of between about 180° C. and about 200° C., for example about 190° C. In an embodiment, the attachment can occur at a pressure of between about 90 psi and about 110 psi, for example at about 100 psi. The attachment process can be performed for a duration of between about 5 minutes and about 15 minutes, for example about 10 minutes.

In an embodiment, the mask can be of a material which can release from the interstitial layer 50 subsequent to removal of the exposed interstitial layer 50 with sufficient ease so as not to lift or otherwise damage the interstitial layer 50, the piezoelectric elements 20, or other structures. Temperatures during an etch such as plasma etch can reach 150° C. which, without intending to be bound by theory, can cure, harden, densify, and/or outgas the mask material and make it more difficult to remove from the interstitial layer 50.

The openings 112 of the mask can be positioned to expose only the polymer and the upper surface of each piezoelectric element 20 to which an electrical connection will be made subsequently, for example with silver epoxy in contact with a printed circuit board (PCB) electrode. The openings 112 should be of a sufficient size so that electrical resistance between the piezoelectric elements 20 and a subsequently formed electrode is within allowable limits which provides for a functional device with acceptable reliability. The openings themselves can be round, oval, square, rectangular, etc.

Subsequently, an etch such as a plasma etch is performed on the FIG. 11 structure to remove the exposed interstitial layer 50. In an embodiment, a plasma etch can be performed under conditions sufficient to reduce processing time. For example, an active ion trap plasma mode can be used in combination with an oxygen process gas. For example, an oxygen gas can be introduced into a plasma etch chamber at a delivery rate sufficient to provide an equilibrium chamber pressure of between about 100 mTorr and about 200 mTorr, for example about 150 mTorr. Plasma can be ignited at a radiofrequency (RF) power of between about 800 W and 1,000 W, for example about 900 W. In the active ion etch plasma mode, the assembly of FIG. 11 can be placed between two adjacent active electrodes. The two adjacent active electrodes can be placed between two grounded electrodes. Depending on the interstitial material, etch time can range from about one second to about one hour, for example between about 5 minutes and 15 minutes, and more particularly between about 5 minutes and 10 minutes. Using a 25 μm thick layer of DuPont 100ELJ, processing time can be between about 1 second and about 15 minutes, for example between about 1 second and about 10 minutes. Plasma modes other than an active ion trap mode can be used depending on the interstitial material, including modes such as a reactive ion etch, electron-free etch, an active etch, an electron-free ion trap, with the mode depending on the configuration of shelves (i.e. active, grounded, and floating) in the plasma chamber.

The plasma etch can effectively remove the interstitial layer 50 from the surface of the nickel-plated PZT piezoelectric elements 20. It has been found that the surface of a nickel-plated PZT piezoelectric element 20 has a high surface roughness which makes removal of the interstitial layer 50 from the relatively deep and narrow (i.e. high aspect ratio) grooves difficult. Dielectric material remaining in the grooves in the nickel plating can increase electrical resistance between the piezoelectric element 20 and a PCB electrode which is subsequently electrically coupled with the piezoelectric element 20. Efficient removal of interstitial material 50 from the etched surface of the piezoelectric elements 20 will decrease resistance and improve the electrical characteristics of the device. The use of a masked plasma etch as described herein removes the dielectric material from these grooves more effectively than conventional removal methods. An etch rate of interstitial material 50 from the relatively narrow grooves within the piezoelectric element 20 is less than an etch rate of interstitial material 50 between adjacent relatively widely spaced piezoelectric elements 20. An unmasked plasma etch may result in excessive loss of interstitial material 50 between adjacent piezoelectric elements 20, thus a masked plasma etch exposing the interstitial material 50 at locations overlying the piezoelectric elements 20 and protecting interstitial material 50 at locations between piezoelectric elements 20 can be used to prevent this loss.

Figure 12:
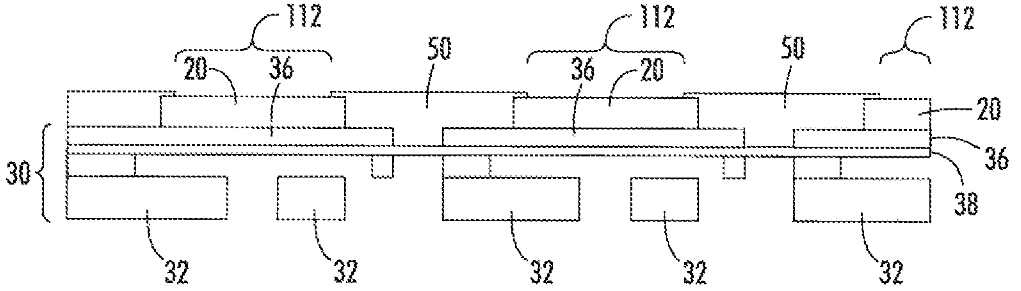

After etching the interstitial layer 50, the patterned mask 110 is removed to result in the structure of FIG. 12. If patterned mask 110 is a patterned photoresist mask, the patterned mask 110 can be removed using standard techniques. If the patterned mask 110 is a thermoplastic polymer such as DuPont 100ELJ, the patterned mask can be removed by peeling, for example.

In another embodiment, an unmasked etch of the FIG. 8 structure can be performed to result in a structure similar to that depicted in FIG. 12, and generally functionally equivalent to the structure of FIG. 12. The plasma etch described above can be timed so that the etch stops just as all piezoelectric elements are sufficiently exposed such that electrical contact can be made to each piezoelectric element. This unmasked etch will remove a portion of the interstitial layer thickness between the piezoelectric elements 20, but the etch is stopped prior to removing an excessive amount of interstitial layer 50 such that device performance is not adversely affected.

In another embodiment, a masked or unmasked laser ablation process can be performed on the FIG. 8 structure to remove the interstitial layer 50 which covers the piezoelectric elements 20 to result in the structure of FIG. 12.

Figure 13:
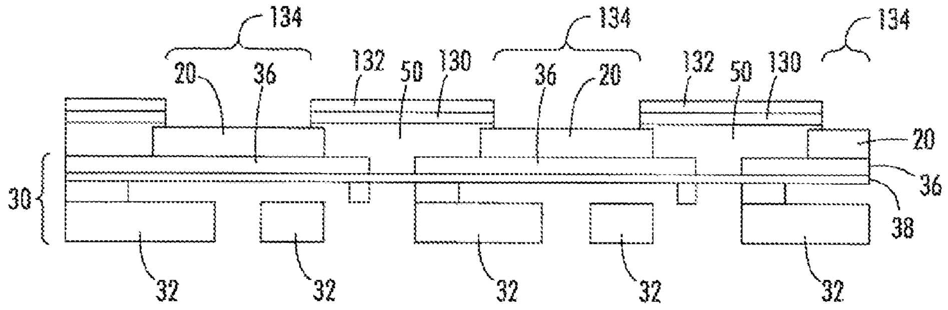

After exposing piezoelectric elements 20 using either a masked or an unmasked removal process, an assembly including a patterned adhesive layer 130 and a patterned removable liner 132 is aligned and attached to the FIG. 12 structure as depicted in FIG. 13. The adhesive 130 can be, for example, a thermoset or thermoplastic sheet. The removable liner 132 can be a polyimide material, or another material which can be removed from the adhesive 130. The assembly including adhesive layer 130 and removable liner 132 includes a pattern of preformed openings 134 therein which expose the piezoelectric elements 20. The openings 134 within the adhesive 130 and liner 132 can be formed prior to attachment, for example using laser ablation, a punch process, etching, etc. The size of the openings 134 can be targeted to match the size of openings 112 in the interstitial layer 50 as depicted, although they can be slightly larger or smaller as long as the size mismatch does not adversely affect subsequent processing. The combined thickness of the adhesive 130 and the removable liner 132 will, in part, determine a quantity of conductor which remains on the piezoelectric elements 20 after subsequent processing. A combined thickness of the adhesive 130 and removable liner 132 can be between about 15 μm and about 100 μm, or another suitable thickness.

Figure 14:
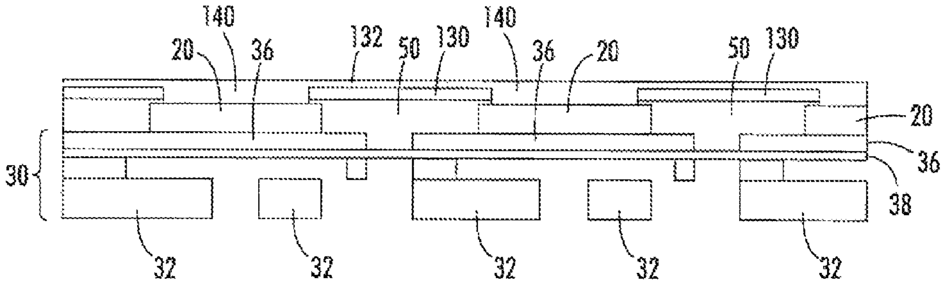

Next, as depicted in FIG. 14, a conductor 140 such is a conductive paste is applied to the FIG. 13 assembly, for example with a screen printing process using the removable liner 132 as a stencil. Alternately, the adhesive can be dispensed onto the assembly.

Figure 15:
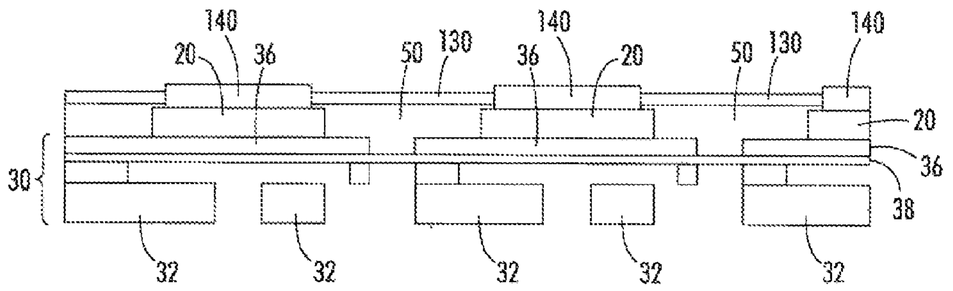

Subsequently, the removable liner 132 is removed from the FIG. 14 structure, for example by peeling, such that a structure similar to that depicted in FIG. 15 remains.

Figure 16:
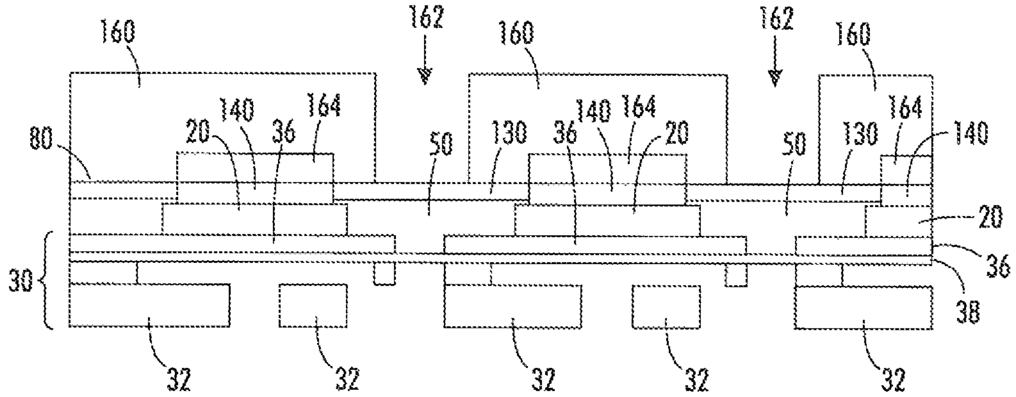

Next, a PCB 160 having a plurality of vias 162 and a plurality of PCB electrodes 164 is attached to the FIG. 10 assembly using the adhesive 130 to result in the structure of FIG. 16. The conductor 140 electrically couples the piezoelectric elements 20 to the PCB electrodes 164 such that a conductive path extends from the PCB electrodes 164 through the conductor 140 to the piezoelectric elements 20.

Figure 17:
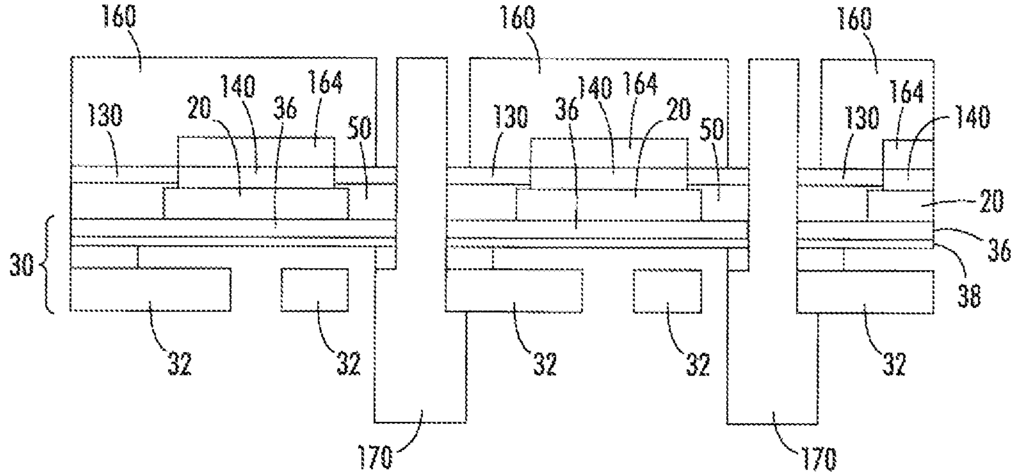
Figure 18:
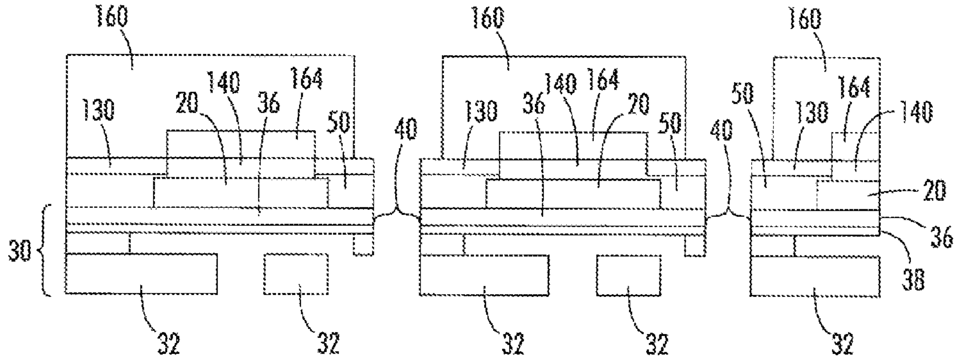

Next, the openings 40 through the diaphragm 36 can be cleared to allow passage of ink through the diaphragm. Clearing the openings includes removing a portion of the adhesive 130, the interstitial layer 50, and the diaphragm attach material 38 which covers the opening 40. In various embodiments, chemical or mechanical removal techniques can be used. In an embodiment, a self-aligned removal process can include the use of a laser beam 170 as depicted in FIG. 17, particularly where the inlet/outlet plate 32, the body plate 34, and the diaphragm 36 are formed from metal. The inlet/outlet plate 32, the body plate 34 and optionally, depending on the design, the diaphragm 36 can mask the laser beam for a self-aligned laser ablation process. In this embodiment, a laser such as a $CO_2$ laser, an excimer laser, a solid state laser, a copper vapor laser, and a fiber laser can be used. A $CO_2$ laser and an excimer laser can typically ablate polymers including epoxies. A $CO_2$ laser can have a low operating cost and a high manufacturing throughput. While two laser beams 170 are depicted in FIG. 17, a single laser beam can open each hole in sequence using one or more laser pulses. In another embodiment, two or more openings can be made in a single operation. For example, a mask can be applied to the surface then a single wide laser beam could open two or more openings, or all of the openings, using one or more pulses from a single wide laser beam. A $CO_2$ laser beam that can over-fill the mask provided by the inlet/outlet plate 32, the body plate 34, and possibly the diaphragm 36 could sequentially illuminate each opening 40 to form the extended openings through the diaphragm attach material 38, the interstitial layer 50, and the adhesive 130 to result in the FIG. 18 structure.

Figure 19:
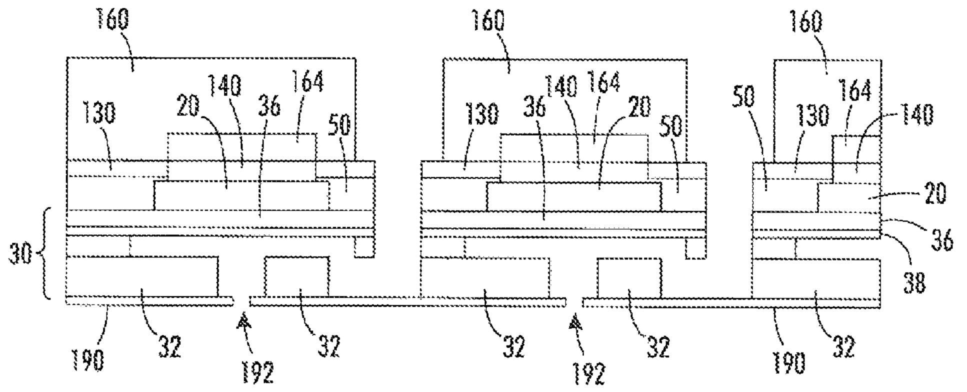

Subsequently, an aperture plate 190 can be attached to the inlet/outlet plate 32 with an adhesive (not individually depicted) as depicted in FIG. 19. The aperture plate 190 can include a plurality of nozzles 192 through which ink is expelled during printing. Once the aperture plate 190 is attached, the jet stack 194 is complete.

Figure 20:
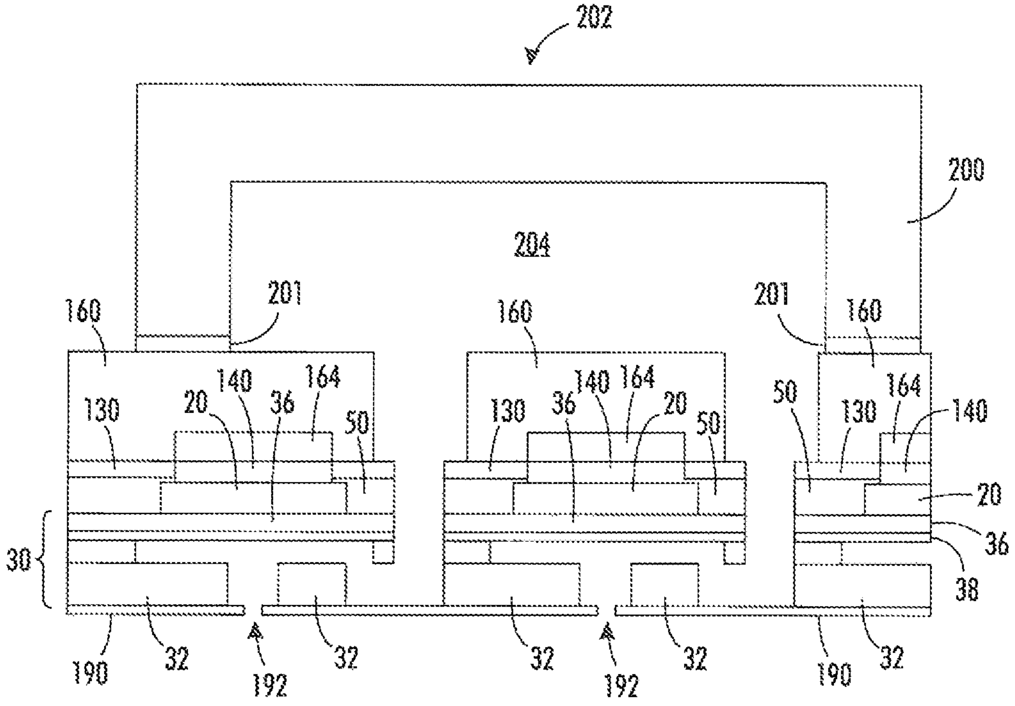
FIG. 20 is a cross section of a print head including a jet stack.

Subsequently, a manifold 200 is bonded to the PCB 160, for example using a fluid-tight sealed connection 201 such as an adhesive to result in an ink jet print head 202 as depicted in FIG. 20. The ink jet print head 202 can include a reservoir 204 within the manifold 200 for storing a volume of ink. Ink from the reservoir 204 is delivered through the vias 162 in the PCB 160 to ports 206 within the jet stack 194. It will be understood that FIG. 20 is a simplified view, and may have additional structures to the left and right of the FIG. For example, while FIG. 20 depicts two ports 206, a typical jet stack can have, for example, a 344×20 array of ports.

In use, the reservoir 204 in the manifold 200 of the print head 202 includes a volume of ink. An initial priming of the print head can be employed to cause ink to flow from the reservoir 204, through the vias 162 in the PCB 160, through the ports 206 in the jet stack 194, and into chambers 208 in the jet stack 194. Responsive to a voltage 210 placed on each electrode 164, each PZT piezoelectric element 20 deflects or deforms at an appropriate time in response to a digital signal. The deflection of the piezoelectric element 20 causes the diaphragm 36 to flex which creates a pressure pulse within the chamber 208 causing a drop of ink to be expelled from the nozzle 192.

The methods and structure described above thereby form a jet stack 194 for an ink jet printer. In an embodiment, the jet stack 194 can be used as part of an ink jet print head 202 as depicted in FIG. 20.

Figure 21:
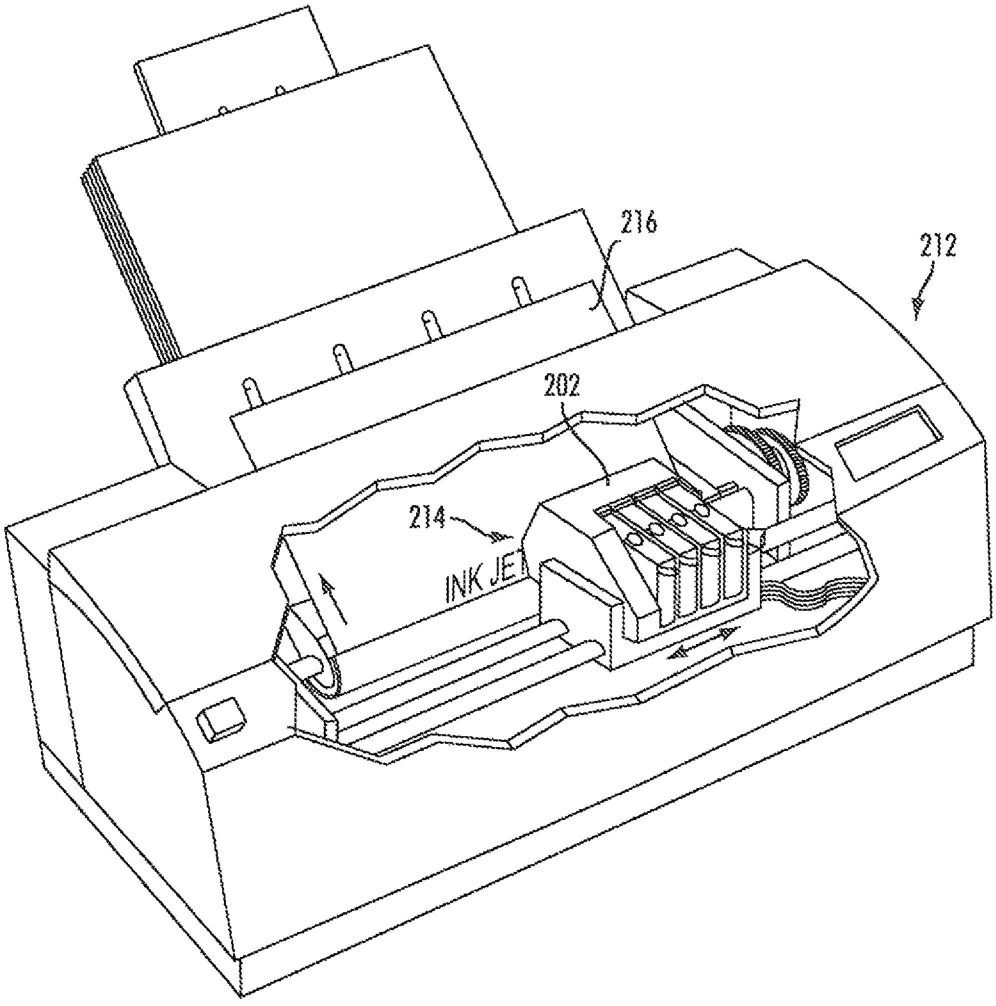
FIG. 21 is a printing device including a print head according to an embodiment of the present teachings.

FIG. 21 depicts a printer including a printer housing 212 into which at least one print head 202 has been installed. During operation, ink 214 is ejected from one or more nozzles 192 in accordance with an embodiment of the present teachings. The print head 202 is operated in accordance with digital instructions to create a desired image on a print medium 216 such as a paper sheet, plastic, etc. The print head 202 may move back and forth relative to the print medium 216 in a scanning motion to generate the printed image swath by swath. Alternately, the print head 202 may be held fixed and the print medium 216 moved relative to it, creating an image as wide as the print head 202 in a single pass. The print head 202 can be narrower than, or as wide as, the print medium 216.

It will be realized that a plasma etch to remove an epoxy material from a piezoelectric element as described above can be performed during the formation of other structures in addition to the specific embodiments discussed above. For example, a PZT piezoelectric structure can be encapsulated as protection against gasses or liquids from contacting the piezoelectric structure, to prevent damage from physical contact with a solid structure, to supply a damping to the piezoelectric structure, etc. The plated or unplated PZT piezoelectric structure can be exposed using a plasma etch as described above to provide a point of physical or electrical contact.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or, more implementations, alterations and/or modifications can be made to the illustrated examples without departing from the spirit and scope of the appended claims. In addition, while a particular feature of the disclosure may have been described with respect, to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of the workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An apparatus for forming an ink jet print head, comprising:

a press comprising a lower press cassette and an upper press plate;

a mold release;

a flexible top plate comprising at least one of glass, silicon, quartz, sapphire, and metal, wherein the one of glass, silicon, quartz, sapphire, and metal has a thickness of between about 25 μm and about 12,700 μm; and a print head jet stack subassembly comprising an uncured interstitial layer overlying and covering a plurality of piezoelectric elements, wherein the mold release and the flexible top plate are interposed between the uncured interstitial layer and the upper press plate, the mold release physically contacts the print head jet stack assembly only at the uncured interstitial layer, and the plurality of piezoelectric elements are not exposed through the uncured interstitial layer.

2. The apparatus of claim 1, wherein the lower press cassette is configured to be heated.

3. The apparatus of claim 1, wherein the flexible top plate comprises one of glass, silicon, quartz, and sapphire, and the flexible top plate has a thickness of between about 500 μm and about 900 μm.

4. The apparatus of claim 1, wherein the flexible top plate has a bending modulus of between about 1 MPa and about 300 MPa.

5. The apparatus of claim 1, wherein the flexible top plate has a bending modulus of between about 10 MPa and about 50 MPa.

* * * * *